United States Patent [19]

Fukushima

[11] Patent Number: 5,097,169
[45] Date of Patent: Mar. 17, 1992

[54] SPOOL CONNECTION FOR BRUSHLESS ALTERNATOR

[75] Inventor: Sumio Fukushima, Himeji, Japan

[73] Assignee: Mitsubishi Denki K.K., Tokyo, Japan

[21] Appl. No.: 433,297

[22] Filed: Nov. 8, 1989

[30] Foreign Application Priority Data

Nov. 9, 1988 [JP] Japan ............... 63-146832[U]

[51] Int. Cl.$^5$ ............... H02K 3/32; H01F 3/00; H01F 15/02; H01F 41/02
[52] U.S. Cl. ............... 310/263; 29/596; 29/606; 310/194; 310/208
[58] Field of Search ............... 29/596, 606; 310/71, 310/208, 251, 263, 68 D; 336/192, 198

[56] References Cited

U.S. PATENT DOCUMENTS

| | | | |
|---|---|---|---|
| 3,671,906 | 6/1972 | Hodges et al. | 310/263 |
| 3,995,244 | 11/1976 | Sayo | 29/606 |
| 4,149,135 | 4/1979 | Roespel et al. | 336/83 |
| 4,604,538 | 8/1986 | Merrill et al. | 310/68 D |
| 4,647,806 | 3/1987 | Giuffrida | 310/68 D |
| 4,662,226 | 5/1987 | Wang | 336/30 |
| 4,894,570 | 1/1990 | Kaneyuki | 310/68 D |

FOREIGN PATENT DOCUMENTS

| | | | |
|---|---|---|---|
| 1551658 | 12/1968 | France | 310/263 |
| 26881 | 8/1975 | Japan | 310/208 |
| 135046 | 9/1985 | Japan | 310/208 |
| 981660 | 1/1965 | United Kingdom . | |
| 1382055 | 1/1975 | United Kingdom . | |
| 1576831 | 10/1980 | United Kingdom . | |

*Primary Examiner*—Steven L. Stephan
*Assistant Examiner*—D. L. Rebsch
*Attorney, Agent, or Firm*—Sughrue, Mion, Zinn, Macpeak & Seas

[57] ABSTRACT

A brushless alternator for a vehicle comprising a field coil holding device formed by mounting a field coil winding spool directly on a field core using a bonding agent thus eliminating the need for a metallic cylindrical spool holder which requires precise machining in order to engage with the field core for welding. With this arrangement, a simple and inexpensive field coil holding device eliminates former precise machining. In addition, a field coil can be wound around the field coil winding spool in advance, before bonding to the field core.

5 Claims, 4 Drawing Sheets

SPOOL CONNECTION FOR BRUSHLESS ALTERNATOR

BACKGROUND OF THE INVENTION

1. Field of the Invention

The present invention relates to a field coil device for a brushless alternator for use in a vehicle and, more particularly, to a field coil holding device to be mounted on a fixed iron core in a brushless alternator for use in a vehicle.

2. Description of the Prior Art

A brushless motor for a vehicle is constituted, as is well known in the art, such that an armature core wound by an armature coil and a field core wound by a field coil are secured to brackets and disposed in a coaxial relationship, and magnetic poles are rotated between a pair of these fixed iron cores for deriving an AC output from the armature coil.

Heretofore, it is well known, in such brushless alternators as described above, that a cylindrical holder is secured to a fixed iron core by welding, or the like, to hold a spool for winding a field coil thereon instead of providing a field coil holding portion on the fixed iron core by engraving a recess at the periphery thereof, since many problems arise in the productivity and cost if such recessed portions are formed at the periphery of the fixed iron core. The disclosure of Japanese Utility Model Laid-open No. 60-135046 or Japanese Utility Model Laid-open No. 58-135081 is hereby incorporated as the prior art by reference.

Now referring to FIG. 1, there is shown a partial sectional view of a brushless alternator for a vehicle provided with a prior art field coil holder of the type mentioned above. A front bracket 1 and a rear bracket 2 of the brushless alternator are connected together by means of a connecting bolt (not shown). An armature core 3 is, then, interposed for mounting between inner peripheral faces of the abutting parts of the brackets 1 and 2, and an armature coil 4 is wound therearound. A rotor 6 is mounted on a rotary shaft 5 which is supported by the brackets 1 and 2 to form a unit body, and rotating magnetic poles 8 and 9 are juxtaposed in a teeth like relationship by interposing non magnetic rings 7 therebetween at the peripheral portion of the rotor 6. Further, a field coil 11 is disposed in a recessed portion 10 of the rotor 6 being formed at the inner peripheral part of the rotating magnetic poles 8 and 9. A field core 12 is secured to the rear bracket 2 and, then, a metallic cylindrical spool holder 14 is secured to the field core 12 by welding, or the like manner, for holding a field coil winding spool 13 made of insulating material.

FIG. 2 is a perspective view illustrating the field core 12 of the alternator shown in FIG. 1. FIG. 3 is a perspective view illustrating the metallic cylindrical spool holder 14 and FIG. 4 is a perspective view illustrating the field coil winding spool 13 wound by the field coil 11. Referring firstly to FIG. 2, a pair of through holes 16 are provided at an outer periphery of the field core 12 in the axial direction thereof for taking out lead wires 15 of the field coil 11. The lead wires 15 of the field coil 11 are then led through these through holes 16 to a power source for power supply.

Since the cylindrical field coil holder of the prior art brushless alternator is provided by welding, or the like method, the metallic cylindrical spool holder 14 of FIG. 3 is welded to the field core 12 of FIG. 2 for holding the field coil winding spool 13. Therefore, a comparatively high dimensional accuracy is required at the engaging parts of the field core 12 and the metallic cylindrical spool holder 14, and also there are too many necessary items to assemble. These requirements have resulted in a high cost in manufacturing. In order to provide the through holes 16 at the periphery of the field core 12, many manufacturing steps are required in machining with respect to the field core 12. In addition to this, there is a problem in winding of the field coil 11 since the winding of the field coil 11 has to be done after the field coil winding spool 13 has been retained at the field core 12 by the metallic cylindrical spool holder 14.

It is, therefore, an object of this invention to provide a simple and inexpensive field coil holding device by eliminating the metallic cylindrical spool holder to solve the problems encountered in the prior art brushless alternator.

SUMMARY OF THE INVENTION

In accordance with the present invention, an improved field coil holding device is provided for a brushless alternator for use in a vehicle by mounting a field coil winding spool directly on a fixed iron core by utilizing a bonding agent and eliminating the necessity of securing the metallic cylindrical spool holder to the iron core by welding. The improved field coil holding device thereby provides a simple and inexpensive structure for the brushless alternator.

Further features and advantages of this invention will become apparent from the following description and drawings showing a presently preferred embodiment, of which:

DESCRIPTION OF THE PREFERRED EMBODIMENT

Figure 5:
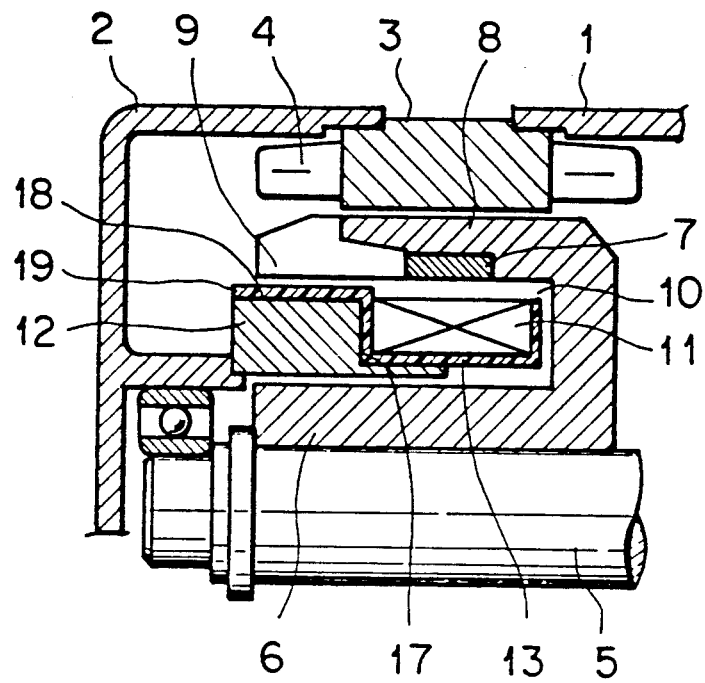
FIG. 5 is a partial sectional view of an embodiment of this invention illustrating a brushless alternator with a field coil holding device.

A preferred embodiment of this invention will now be described in more detail with reference to the accompanying drawings, in the several figures of which like reference numerals identify like elements. Referring to FIG. 5, there is shown an embodiment of this invention thereby illustrating a brushless alternator for a vehicle in a partial sectional view. As seen, the brushless alternator is quite similar in basic structure to that of the prior art shown in FIG. 1.

A front bracket 1 and a rear bracket 2 are combined by utilizing connecting bolts (not shown) whereby an armature core 3 is interposed therebetween at the inner peripheral faces of the abutting parts of the brackets 1, 2 and an armature coil 4 is wound around the armature core 3. A rotor 6 is integrally mounted on a rotary shaft 5 which is supported by the brackets 1, 2 to form a unit body and rotating magnetic poles 8, 9 are juxtaposed in a teeth like relationship by interposing non magnetic rings 7 therebetween at the peripheral portion of the rotor 6. Further, a field coil 11 is disposed in a recessed portion 10 of the rotor 6 formed at the inner peripheral side of the rotating magnetic poles 8, 9 and a field core 12 is secured to the rear bracket 2.

A field coil winding spool 13 made of an insulating material is securely mounted, by bonding, directly on a bonding surface 17 formed at one end of the field core 12.

Figure 6:
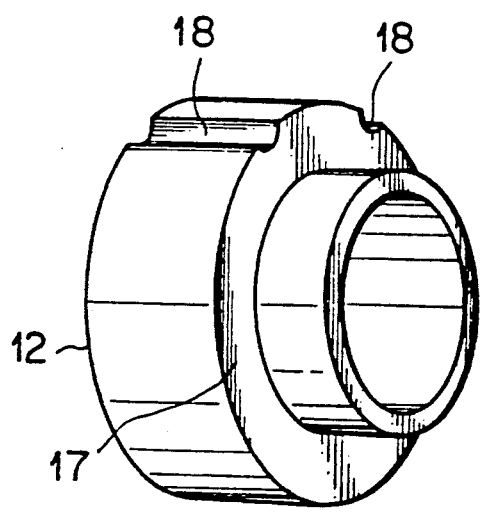
FIG. 6 is a perspective view of a field core in the embodiment of the invention shown in FIG. 5.
Figure 7:
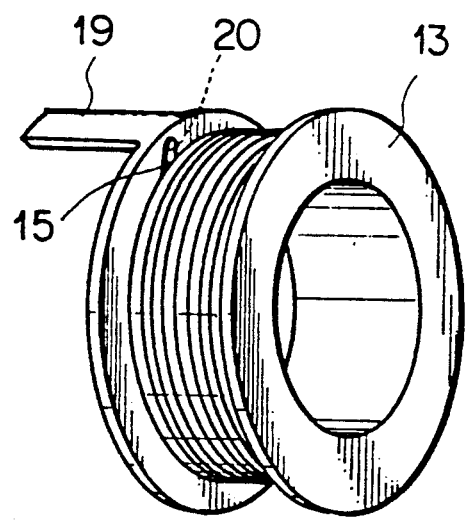
FIG. 7 is a perspective view of a field coil winding spool in the embodiment of the invention shown in FIG. 5.

FIG. 6 is a perspective view of the field core 12 in accordance with the present invention and FIG. 7 is a perspective view of the field coil winding spool 13 for the field coil 11. As illustrated in FIG. 6, grooves 18 are provided at the outer periphery of the field core 12 for taking out lead wires 15 of the field coil 11 therethrough and, in turn, flanges 19 are provided at the outer periphery of the field coil winding spool 13 in such relation as to conform to the grooves 18 of the field core 12 and through holes 20 at the inner periphery of the spool underneath the flanges 19 for guiding out the lead wires 15 therethrough. The flanges 19 of the field coil winding spool 13 are brought over the grooves 18 of the field core 12 when the field coil winding spool 13 is bonded to the field core 12 for providing covered grooves, thereby the lead wires 15 of the field coil 11 are led out through the through holes 20 and passed through the covered grooves 18 to a power source under the protection of flanges 19.

In an arrangement of the field coil holding device as described above, since the spool 13 and the field core 12 are securely attached by bonding, they move neither to the circumferential direction nor to the axial direction with respect to each other, moreover, there is no problem in machine machining to achieve dimensional accuracy at the engaging portions of the metallic cylindrical spool holder and the field core as it has encountered in the prior art field coil holder employing the welding, or the like method, to secure the cylindrical holder to the field core. Accordingly, a simple and inexpensive structure for the field coil holding device can be provided in accordance with the present invention.

Further, in accordance with this invention, since the grooves 18 for threading the lead wires 15 therethrough are provided at the outer periphery of the field core 12, the field coil 11 can be wound around the spool 13 in advance and then assembled to the field core 12. Thus resulting in a considerable decrease in the amount of work required to wind the field coil 11 as compared to the prior art field coil holder. Moreover, since the grooves 18 can simultaneously be formed in the forging of the field core 12, such machining as forming the through holes in the field core 12 can be eliminated and thus improve the workability. Further, there is no need to install insulating pipes for the lead wires 15 because of the structural feature of the present invention that the lead wires 15 are embedded in the grooves 18 of the field core 12 and filled with the insulating flanges 19 of the spool 13 provide electrical insulation and mechanical protection.

Figure 8:
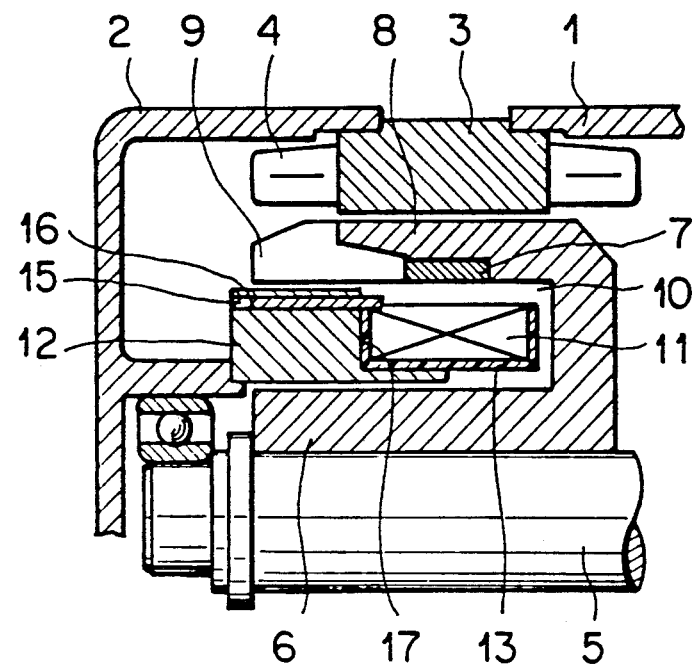
FIG. 8 is a partial sectional view of another embodiment of the invention.
Figure 9:
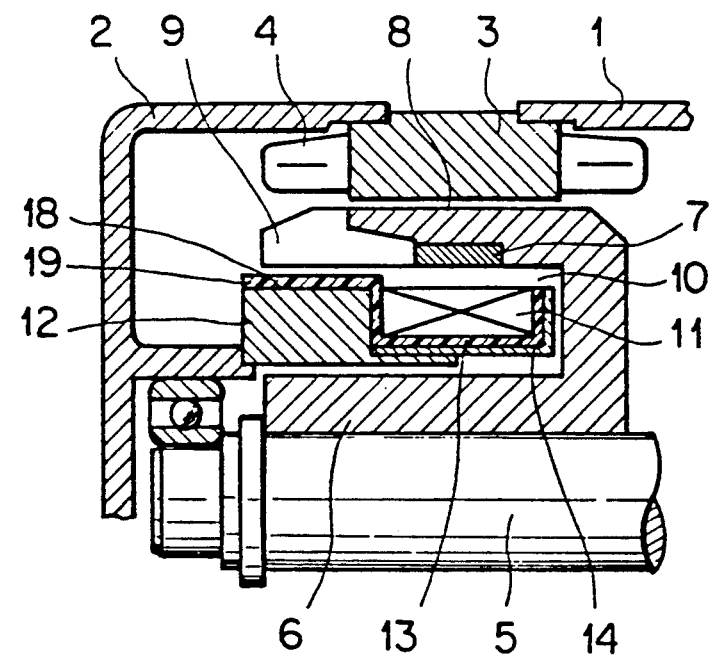
FIG. 9 is a partial sectional view of a brushless alternator to which the field core shown in FIG. 6 is employed for taking out lead wires from the field coil.

Referring now to FIG. 8, there is shown another embodiment of this invention. The structural features of this embodiment for securing a field coil winding spool 13 directly to a field core 12 by bonding in order to eliminate the metallic cylindrical spool holder are equivalent to the embodiment shown in FIG. 5 except for the lead wire take out structure. In this embodiment, through holes are employed for taking out lead wires 15 from a field coil 11 a similar arrangement to the prior art lead wire take out structure shown in FIG. 1. The rest of the structure of the brushless alternator and the accompanying advantages of simplicity, inexpensiveness and improved workability are the same as that of the previously described embodiment, therefore, no further description will be made for the embodiment shown in FIG. 8.

Figure 1:
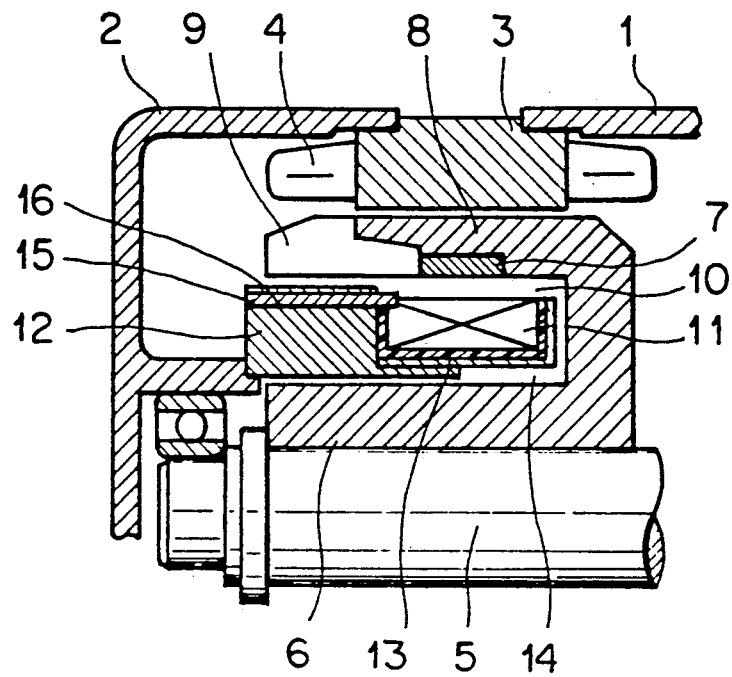
FIG. 1 is a partial sectional view of a brushless alternator for a vehicle provided with a prior art field coil holder.
Figure 2:
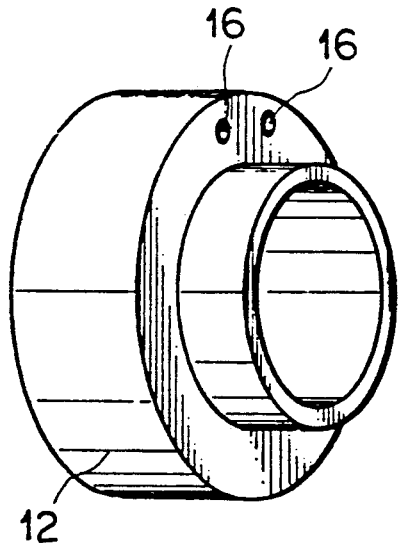
FIG. 2 is a perspective view of a field core of the prior art.
Figure 3:
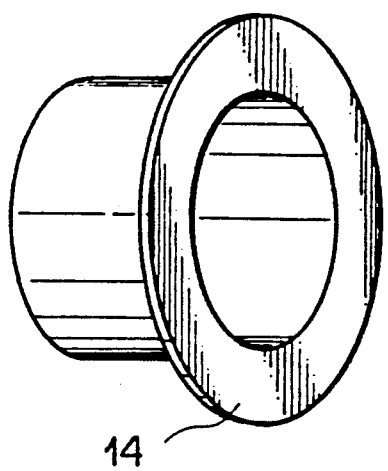
FIG. 3 is a perspective view of a metallic cylindrical spool holder of the prior art.
Figure 4:
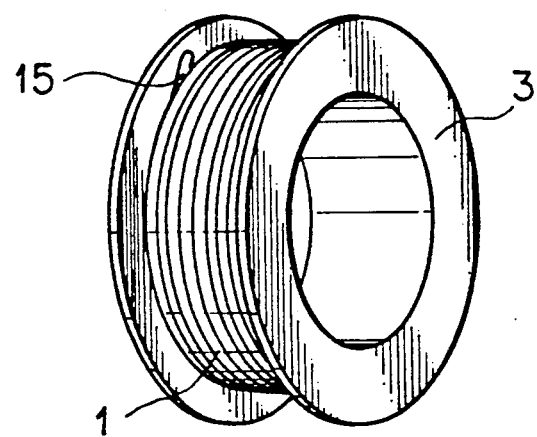
FIG. 4 is a perspective view of a field coil winding spool of the prior art.

In the embodiment described above with reference to FIG. 5, the lead wires 15 are led out from the field coil 11 through the structure constituted by the grooves 18 at the outer periphery of the field core 12, the through holes 20 at the inner periphery of spool 13 and the flanges 19 at the outer periphery of the spool 13, however, this structure may be substituted for the through holes 16 in the field coil holder of the prior art type shown in FIG. 1 for taking out lead wires 15 from the field coil 11.

As it has been described above, according to the present invention, there is no need to use a metallic cylindrical spool holder welded to the field core for holding the field coil spool, since the field coil spool is directly secured to the field core by bonding or adhesion. Further there is no need to attaining dimensional accuracy in the machining at the engaging portions of the field core and the metallic cylindrical spool holder as in the prior art field coil holder.

Although the present invention has been described in detail with reference to the presently-preferred embodiments, it should be understood by those of ordinary skill in the art that various modifications can be made without departing from the spirit and scope of the invention. Accordingly, the invention is not to be limited except as by the appended claims.

What is claimed is:

1. A brushless alternator for a vehicle comprising a field coil holder, wherein the field core is provided with grooves at the periphery thereof and said field coil holder is provided with flange portions at the outer periphery thereof that conform to said grooves of said field core for constituting a structure to take out the lead wires from the field coil.

2. A brushless alternator for a vehicle comprising a field coil holder, wherein said field coil holder comprises a field coil winding spool securely mounted directly on a field core by bonding;
  in which the field core is provided with grooves at the outer periphery thereof for accepting lead wires of a field coil and the field coil winding spool is provided with flange portions that conform to the grooves at the outer periphery thereof for covering the grooves.

3. A brushless alternator for a vehicle in accordance with claim 2, in which the field coil winding spool is further provided with through holes at the inner periphery thereof which correspond to an underneath side of the flanges for guiding out the lead wires from the field coil.

4. A brushless alternator for a vehicle comprising a field coil holder, wherein said field coil holder comprises a field coil winding spool securely mounted directly on a field core by bonding;

in which the field core is provided with through holes for guiding out the lead wires from the field coil.

5. A brushless alternator for a vehicle comprising a field coil holder, wherein said field coil holder comprises a field coil winding spool securely mounted directly on a field core by bonding;

in which the field coil winding spool is made of insulating material.

* * * * *